(12) United States Patent
Shibata et al.

(10) Patent No.: US 6,352,208 B1
(45) Date of Patent: Mar. 5, 2002

(54) AIR CONDITIONING APPARATUS WITH AIR-TEMPERATURE ADJUSTMENT

(75) Inventors: Kazuji Shibata, Kariya; Tomohiro Kamiya, Takahama, both of (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/496,966

(22) Filed: Feb. 2, 2000

(30) Foreign Application Priority Data

Feb. 4, 1999 (JP) .......................................... 11-027864
Nov. 5, 1999 (JP) .......................................... 11-315555

(51) Int. Cl.[7] .............................. B60H 1/00; B60H 1/06
(52) U.S. Cl. ............. 237/2 A; 237/12.3 A; 237/12.3 B; 165/202; 165/42; 165/43; 165/299; 454/156; 454/161
(58) Field of Search ............................ 165/42, 43, 202, 165/299; 237/12.3 A, 12.3 B, 2 A; 454/156, 161

(56) References Cited

U.S. PATENT DOCUMENTS

| | | | |
|---|---|---|---|
| 4,653,689 A | * 3/1987 | Sakurai et al. | ......... 237/12.3 B |
| 4,815,658 A | * 3/1989 | Hidemitsu et al. | .......... 237/2 A |
| 5,755,282 A | 5/1998 | Teshima et al. | |
| 5,893,407 A | 4/1999 | Okamoto et al. | |
| 5,957,377 A | 9/1999 | Inoue et al. | |
| 6,009,934 A | 1/2000 | Sunaga et al. | |
| 6,131,652 A | * 10/2000 | Ito et al. | ..................... 454/156 |

FOREIGN PATENT DOCUMENTS

| | | |
|---|---|---|
| GB | 1123231 | 8/1968 |
| GB | 1450740 | 9/1976 |
| JP | 7-144529 | 6/1995 |
| JP | 8-324225 | 12/1996 |
| JP | A-10-226219 | 8/1998 |
| JP | A-11-129730 | 5/1999 |

* cited by examiner

*Primary Examiner*—John K. Ford
(74) *Attorney, Agent, or Firm*—Harness, Dickey & Pierce, PLC

(57) ABSTRACT

A vehicle air conditioning apparatus includes a hot water valve for adjusting a flow amount of hot water flowing into a heating heat exchanger, a bypass passage through which air bypasses the heating heat exchanger, and a bypass door for opening and closing the bypass passage. In a high-temperature side area where temperature of air blown into the passenger compartment becomes higher, the temperature of air to be blown into the passenger compartment is adjusted by a hot-water flow adjustment of the hot water valve while the bypass door is operated at a fully closed position. On the other hand, in a low-temperature side area where temperature of air blown into the passenger compartment becomes lower, the temperature of air to be blown into the passenger compartment is adjusted by combining the hot-water flow adjustment of the hot water valve and the air flow adjustment of the bypass door. Thus, even in a minute flow area of hot water flowing into the heating heat exchanger, the temperature of air blown into the passenger compartment is accurately adjusted.

6 Claims, 7 Drawing Sheets

AIR CONDITIONING APPARATUS WITH AIR-TEMPERATURE ADJUSTMENT

CROSS-REFERENCE TO RELATED APPLICATION

This application is related to and claims priority from Japanese Patent Applications No. Hei. 11-27864 filed on Feb. 4, 1999, and No. Hei. 11-315555 filed on Nov. 5, 1999.

BACKGROUND OF THE INVENTION

1. Field of the Invention

The present invention relates to a vehicle air conditioning apparatus which adjusts temperature of air blown into a passenger compartment by combining a hot water valve for adjusting a flow amount of hot water flowing into a heating heat exchanger and a cool air bypass door for adjusting a cool air amount bypassing the heating heat exchanger.

2. Description of Related Art

In an air mixing method of a conventional air conditioning apparatus described in U.S. Pat. No. 5,893,407, a ratio between an amount of cool air bypassing a heating heat exchanger and an amount of warm air passing through the heating heat exchanger is adjusted by an air mixing door, so that temperature of air blown into a passenger compartment is adjusted.

On the other hand, in a hot-water flow adjustment method, an amount of hot water flowing into a heating heat exchanger is adjusted so that temperature of air blown into the passenger compartment is adjusted. In this hot-water flow adjustment method, because a mixing space for mixing cool air and warm air in the air mixing method and an operation space of the air mixing door are not necessary, a size of an air conditioning case can be reduced. Further, since the mixing space is unnecessary, a flow resistance is reduced, and thereby reducing electrical power consumption of a blower unit and air-blowing noise.

However, in the hot-water flow adjustment method, in a case where the temperature of blown-air is in a low-temperature area (i.e., cooling side area), when a user (passenger) further operates a temperature adjustment operation member of an air conditioning panel toward a low-temperature side, the temperature of blown-air is not immediately reduced even when the flow amount of hot water is reduced by reducing an opening degree of a hot water valve. That is, a change of actual temperature of air blown into the passenger compartment is greatly delayed as compared with a temperature-changing operation of the user. Therefore, a temperature-changing response delay for the user may be caused.

Further, the heating heat exchanger has radiation characteristics that, the temperature of blown air is rapidly increased with an increase of hot-water flow amount in a small flow amount area after the hot water valve is opened, and thereafter, the increase ratio of blown-air temperature relative to the increase of the hot-water flow amount becomes slowly. For continuously accurately adjusting the temperature of air blown into the passenger compartment, a hot water valve for finely adjusting the hot-water flow amount in a small-flow area is necessary. However, when the opening degree of the hot water valve is throttled to a little opening degree, a pressure difference between hot water before flowing into the hot water valve and after flowing through the hot water valve becomes larger, a flow rate of hot water passing through a throttle portion of the hot water valve becomes faster, and water-flowing noise is increased.

In a vehicle air conditioning apparatus described in JP-A-10-226219, during a maximum cooling where a hot water valve is fully closed, a cool air bypass passage is opened by a max-cool door. However, because the max-cool door opens the cool air bypass passage only during the maximum cooling, the temperature of blown-air is not controlled in the other control area. Thus, the same problem described above in the hot-water flow adjustment method may be caused.

SUMMARY OF THE INVENTION

In view of the foregoing problems, it is an object of the present invention to provide a vehicle air conditioning apparatus using a hot-water flow adjustment, which accurately adjusts temperature of air blown into a passenger compartment without a minute flow control of hot water.

According to an aspect of the present invention, an air conditioning apparatus for a vehicle includes a heating heat exchanger disposed in an air conditioning case to form a bypass passage through which air bypasses the heating heat exchanger, a hot water valve for adjusting a flow amount of hot water flowing into the heating heat exchanger, and a bypass door for opening and closing the bypass passage. In a first set temperature area where temperature of air blown into the passenger compartment is set to be higher than a predetermined temperature, the bypass door fully closes the bypass passage and temperature of air to be blown into the passenger compartment is adjusted by a hot-water flow adjustment of the hot water valve. On the other hand, in a second set temperature area where the temperature of air blown into the passenger compartment is set to be lower than the predetermined temperature, the temperature of air to be blown into the passenger compartment is adjusted by combining the hot-water flow adjustment of the hot water valve and an air flow adjustment of the bypass door. Thus, in the second set temperature area, the temperature of air blown into the passenger compartment can be accurately adjusted by mixing cool air from the bypass passage into warm air from the heating heat exchanger, even when the flow amount of hot water is not adjusted in minute by the hot water valve in the second set temperature area. As a result, it is unnecessary to set the hot water valve at a minute opening degree, and flow noise of hot water can be greatly reduced. Further, when the temperature of air blown into the passenger compartment is controlled to a low-temperature side, the air temperature is immediately reduced by increasing the amount of cool air from the bypass passage, and therefore, the temperature of air blown into the passenger compartment is immediately changed with a variation in a set temperature.

In the air conditioning apparatus, the hot water valve is fully opened and the bypass door fully closes the bypass passage at a highest-temperature position of an operation member, and the hot water valve is fully closed and the bypass door fully opens the bypass passage at a lowest-temperature position of the operation member. Further, when the operation member operates from the highest-temperature position to a predetermined position between the highest-temperature position and the lowest-temperature position, the hot water valve gradually reduces the flow amount of hot water flowing into the hot water valve while the bypass door maintains at a fully closing state of the bypass passage, and the bypass door increases an opening degree of the bypass passage so that the amount of air passing through the bypass passage is gradually increased when the operation member operates from the predetermined position toward the lowest-temperature position. Thus, heating capacity in a heating operation and cooling capacity in a cooling operation can be sufficiently improved in maximum.

Preferably, when the operation member operates from the lowest-temperature position toward a side of the highest-temperature position, the hot water valve is opened at one step from a fully closed state to a predetermined opening degree where the flow amount of hot water flowing into the heating heat exchanger is equal to or larger than a predetermined flow amount corresponding to 5% of a maximum flow amount due to the hot water valve. Therefore, the flow noise of hot water is effectively reduced.

On the other hand, according to an another aspect of the present invention, an air conditioning apparatus for a vehicle includes an operation member for cooperating the hot water valve and the bypass door, the operation member is operable in an entire operation range between a lowest-temperature position where temperature of air blown into the passenger compartment becomes minimum and a highest-temperature position where the temperature of air blown into the passenger compartment becomes maximum. In a first area from the lowest-temperature position among the entire operation range of the operation member, the temperature of air to be blown into the passenger compartment is adjusted by a hot-water flow adjustment of the hot water valve while the bypass door maintains at a fully opened state where the bypass passage is fully opened. Further, when the operation member operates from the first area to a side of the highest-temperature position, the bypass door reduces the opening degree of the bypass passage from the fully opened state so that the temperature of air to be blown into the passenger compartment is adjusted by combining the hot-water flow adjustment of the hot water valve and an air flow adjustment of the bypass door. Thus, a variation in air temperature due to a variation in hot-water temperature caused with variation in a vehicle engine operation is restricted, and air-conditioning feeling for a passenger in a passenger compartment is improved.

Further, when the temperature of air blown into the passenger compartment is set to be lower than a first predetermined temperature, a face mode where air is blown from a face opening is set, and the temperature of air to be blown into the passenger compartment is adjusted by a hot-water flow adjustment of the hot water valve while the bypass door fully opens the bypass passage during the face mode. When the temperature of air blown into the passenger compartment is set to be higher than a second predetermined temperature higher than the first predetermined temperature, a foot mode where air is blown from the foot opening is set. When the temperature of air blown into the passenger compartment is set between the first and second temperatures, a bi-level mode where air is blown from both the face opening and the foot opening is set. Further, during foot mode and the bi-level mode, an opening degree of the bypass door is reduced from a fully-opened state, and the temperature of air to be blown into the passenger compartment is adjusted by combining the hot-water flow adjustment of the hot water valve and an air amount adjustment of the bypass door. Thus, during the face mode, a temperature changing range of air blown into the passenger compartment is reduced, and air-conditioning feeling is further improved. On the other hand, even during the bi-level mode and the foot mode, the temperature-changing range is reduced as compared with a method where the air temperature is adjusted only by the hot water valve.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

Figure 1:
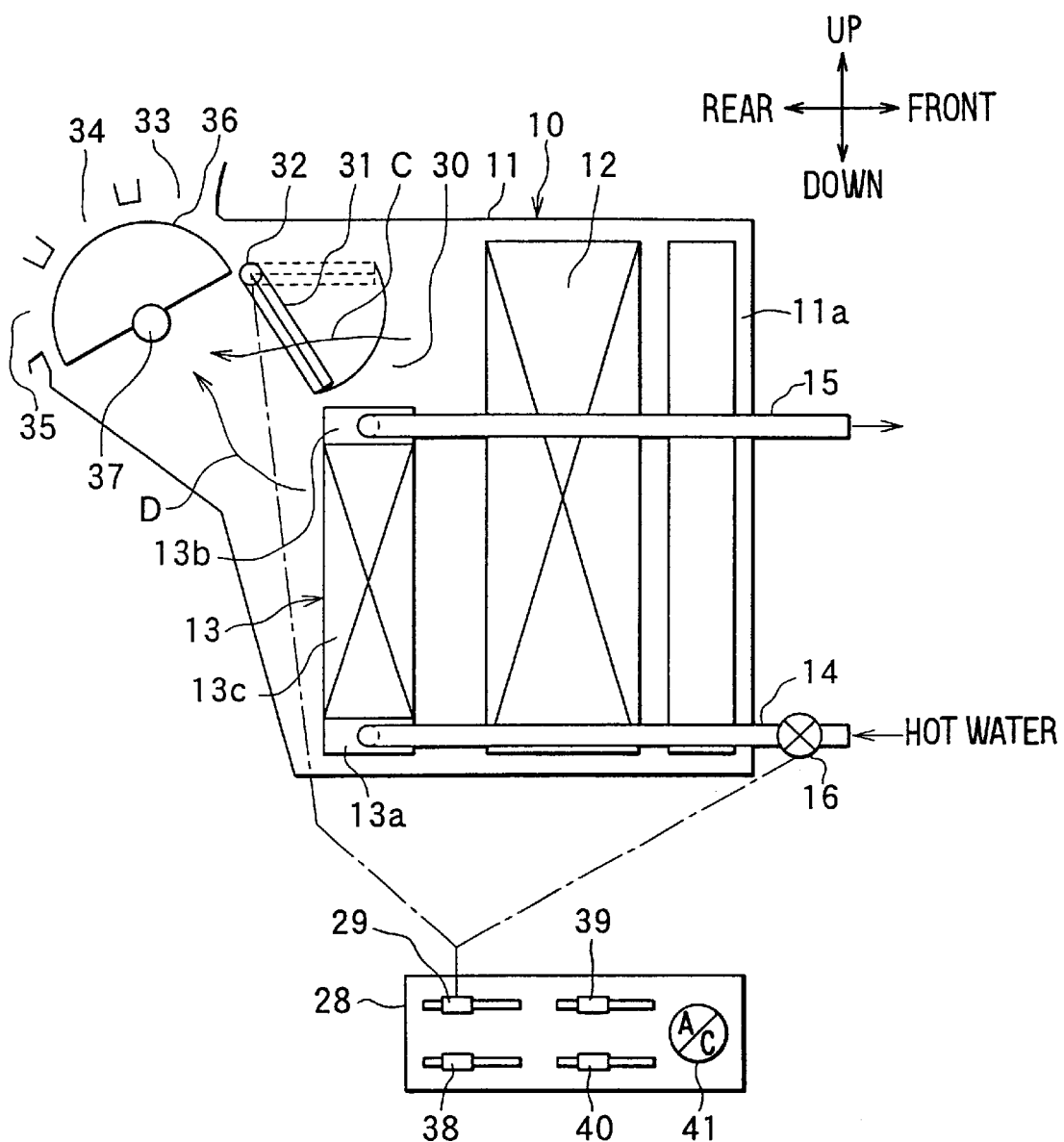
FIG. 1 is a schematic view of a vehicle air conditioning apparatus according to a first preferred embodiment of the present invention.

As shown in FIG. 1, a ventilation system of a vehicle air conditioning apparatus includes a blower unit (not shown) and an air conditioning unit 10. The air conditioning unit 10 is disposed under an instrument panel portion within a passenger compartment at an approximate center part in a vehicle right-left direction. Further, the air conditioning unit 10 is mounted in the vehicle to correspond to an arrangement direction shown in FIG. 1 relative to a vehicle front-rear direction and a vehicle up-down direction.

On the other hand, the blower unit is disposed in the passenger compartment of the vehicle to be offset toward a side (i.e., front-passenger's side) of the air conditioning unit 10. As being very known, in the blower unit, an inside/outside air switching box (not shown) for selectively introducing inside air (i.e., air inside the passenger compartment) and outside air (i.e., air outside the passenger compartment) is disposed at an upper side of a centrifugal fan, and inside air or outside air introduced from the inside/outside air switching box is blown toward the air conditioning unit 10 by the centrifugal fan.

As shown in FIG. 1, the air conditioning unit 10 includes an evaporator (i.e., cooling heat exchanger) 12 and a heater core (i.e., heating heat exchanger) 13 which are integrally disposed within an air conditioning case 11.

The air conditioning case 11 is made of resin which has an elasticity to some degree and is superior in a strength, such as polypropylene, and is composed of plural division case portions. Plural division case portions of the air conditioning case 11 are integrally connected by a fastening unit such as a metal spring clip and a screw, after the evaporator 12, the heater core 13 and components such as a door described later are accommodated therein, to construct the air conditioning unit 10.

The evaporator 12 is disposed within the air conditioning case 11 at a vehicle front side. The evaporator 12 is disposed in the air conditioning case 11 to cross an entire air passage within the air conditioning case 11. In a refrigerant cycle of the vehicle air-conditioning apparatus, refrigerant of the refrigerant cycle flows into the evaporator 12, and absorbs an evaporation-latent heat from air passing through the evaporator 12, so that air passing through the evaporator 12 is cooled.

An air inlet 11a is opened in a front-passenger's seat-side side surface of the air conditioning case 11 on a vehicle front side from the evaporator 12. Air blown from the blower unit flows into the air inlet 11a of the air conditioning case 11.

The evaporator 12 is a laminating type where plural flat tubes each of which is formed by connecting both flat metal plates and plural corrugated fins are laminated and are integrally brazed.

Next, a heater core 13 is adjacently disposed at a downstream air side (i.e., vehicle rear side) of the evaporator 12 to heat air having passed through the evaporator 12. Hot water (engine-cooling water) having a high temperature flows through the heater core 13 and air passing through the heater core is heated using hot water as a heating source.

The heater core 13 of the first embodiment includes a hot-water inlet tank 13a disposed at a lower side, a hot-water outlet tank 13b disposed at an upper side, and a heat-exchanging core portion 13c between the hot-water inlet tank 13a and the hot-water outlet tank 13b. The heat-exchanging core portion 13 are integrally brazed after laminating plural flat tubes each of which is formed by connecting both flat metal plates and the plural corrugated fins.

Thus, the heater core 13 is a one-way flow type in which hot water from the hot water inlet tank 13a flows upwardly through the entire flat tubes from below. A hot water inlet pipe 14 is connected to the hot-water inlet tank 13a, and a hot water outlet pipe 15 is connected to the hot-water outlet tank 13b. Therefore, hot water circulates between a vehicle engine (not shown) and the heater core 13 through the hot water inlet and outlet pipes 14, 15.

Further, a hot water valve 16 is disposed in the hot-water inlet pipe 14. The hot water valve 16 adjusts a flow amount of hot water flowing into the heater core 13 so that the temperature of air blown into the passenger compartment is adjusted.

Figure 2:
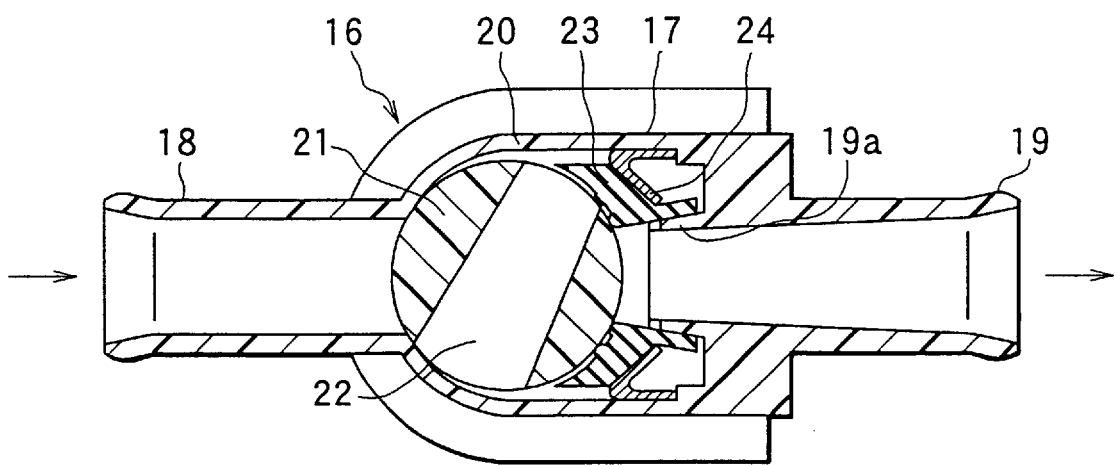
FIG. 2 is a horizontal sectional view of a hot water valve used for the first embodiment of the present invention.
Figure 3:
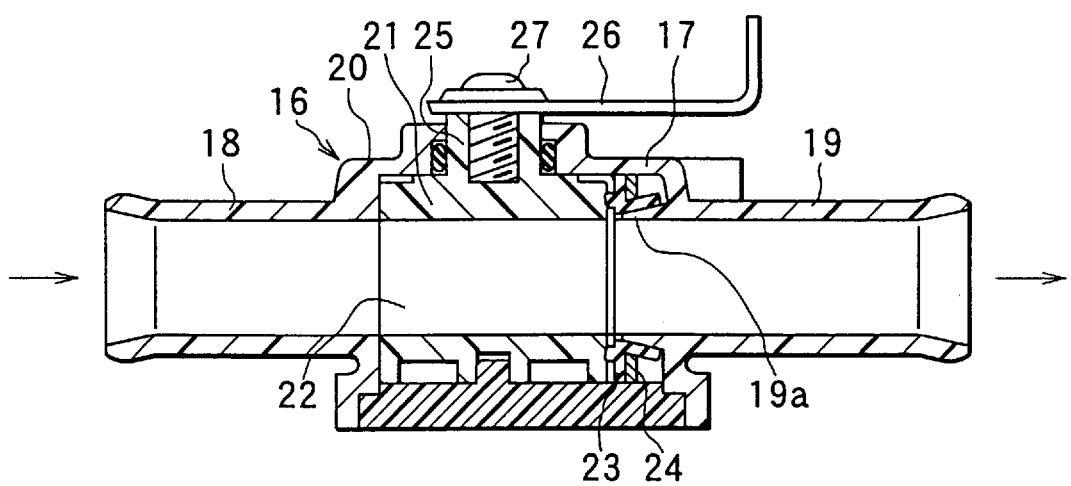
FIG. 3 is a vertical sectional view of the hot water valve in FIG. 2.

FIGS. 2, 3 show the structure of the hot water valve 16. As shown in FIGS. 2, 3, the hot water valve 16 includes a valve housing 17 which is formed by an inlet pipe 18, an outlet pipe 19 and a valve-receiving portion 20 placed between the inlet pipe 18 and the outlet pipe 19.

Within the valve receiving portion 20, a cylindrical valve body 21 made of resin is rotatably accommodated. A valve port 22 penetrating through the valve body 21 in a radial direction of the cylindrical shape is opened in the valve body 21 at a middle portion in an axial direction of the cylindrical shape. Therefore, by adjusting a rotation position of the valve body 21, an opening area (opening degree) of a valve port 21 relative to the inlet pipe 18 and the outlet pipe 19 is changed, and a flow amount of hot water flowing into the heating heat exchanger 13 is adjusted. FIG. 2 shows a fully closed state of the hot water valve 16, and FIG. 3 shows a fully opened state of the hot water valve 16.

In the valve receiving portion 20, a packing member 23 made of rubber is disposed at an outer peripheral side of an inlet end 19a of the outlet pipe 19, and the packing member 23 is press-fitted to an outer surface of the valve body 21 by the metal spring member 24, so that a hot water leakage on the outer surface side of the valve body 21 is prevented.

Further, a shaft portion 25 protruding toward an outside of the valve housing 17 is integrally formed with an end portion of the valve body 21 in the axial direction, and a driving lever 26 is integrally connected to the shaft portion 25 through a bolt 27. The driving lever 26 is mechanically connected to a temperature-adjustment operation member 29 of an air-conditioning operation panel 28 through a link mechanism, a cable and the like. The operation member 29 is a lever member manually operated by a passenger, and a rotation position (i.e., rotation amount) of the valve body 21 is adjusted through a manual operation of the operation member 29.

As shown in FIG. 1, the heater core 13 has a dimension (height) in the up-down direction, smaller than that of the evaporator 12 so that a cool air bypass passage 30 is formed at an upper side of the heater core 13. A cool air bypass door 31 for opening and closing the cool air bypass passage 30 is disposed at an upper side of the heater core 13. In the first embodiment, the cool air bypass door 31 is a plate door rotatable around a rotation center 32.

The rotation shaft 32 of the cool air bypass door 31 is mechanically connected to the temperature-adjustment operation member 29 of the air-conditioning operation member 28 through a link mechanism, a cable or the like. That is, in the first embodiment, both the hot water valve 16 and the cool air bypass door 31 are mechanically connected to the temperature-adjustment operation member 29 through a connection member such as a link mechanism and a cable. Therefore, the hot water valve 16 and the cool air bypass door 31 are operatively linked by a manual operation of the operation member 29.

On the other hand, a defroster opening portion 33, a face opening portion 34 and a foot opening portion 35 are opened on an upper side of the air conditioning case 11 at a downstream air side. Here, the defroster opening portion is for blowing air toward an inner surface of a windshield through a defroster duct and a defroster air outlet (not shown). Further, the face opening portion 34 is for blowing air toward the head portion of a passenger in the passenger compartment through a face duct and a face air outlet (not shown). Further, the foot opening portion 35 is for blowing warm air toward the foot area of a passenger on a right or left seat in the passenger compartment through a foot duct and a foot air outlet (not shown).

In the first embodiment, as an air outlet mode switching door, a rotary door 36 having a semi-cylindrical shape is used. The rotary door 36 is rotated around a rotation shaft 37 so that the three opening portions 33–35 are selectively opened and closed. Because the rotary door 36 has the semi-cylindrical shape, an inner space within the rotary door 36 can be used as a mixing space for mixing cool air from the cool air bypass passage 30 and warm air from the heater core 13.

The rotation shaft 37 of the rotary door 36 is mechanically connected to an air-outlet mode operation member 38 of the air-conditioning operation panel 28 through a link mechanism, a cable or the like. By manually operating the operation member 38, the rotation position of the rotary door 36 is adjusted. Further, in the air-conditioning operation panel 28, there is provided with an inside/outside air-selecting operation member 39, an air-amount switching operation member 40, an air-conditioning switch 41 for switching an on/off operation of a compressor of the refrigerant cycle, and the like.

Next, operation of the air conditioning apparatus according to the first embodiment of the present invention will be now described. Air blown by the blower unit is firstly cooled and dehumidified by the evaporator 12, and is heated in the heater core 13. Thereafter, conditioned air is blown into the passenger compartment through the opening portions 33–35 selected by the rotary door 36.

Figure 4:
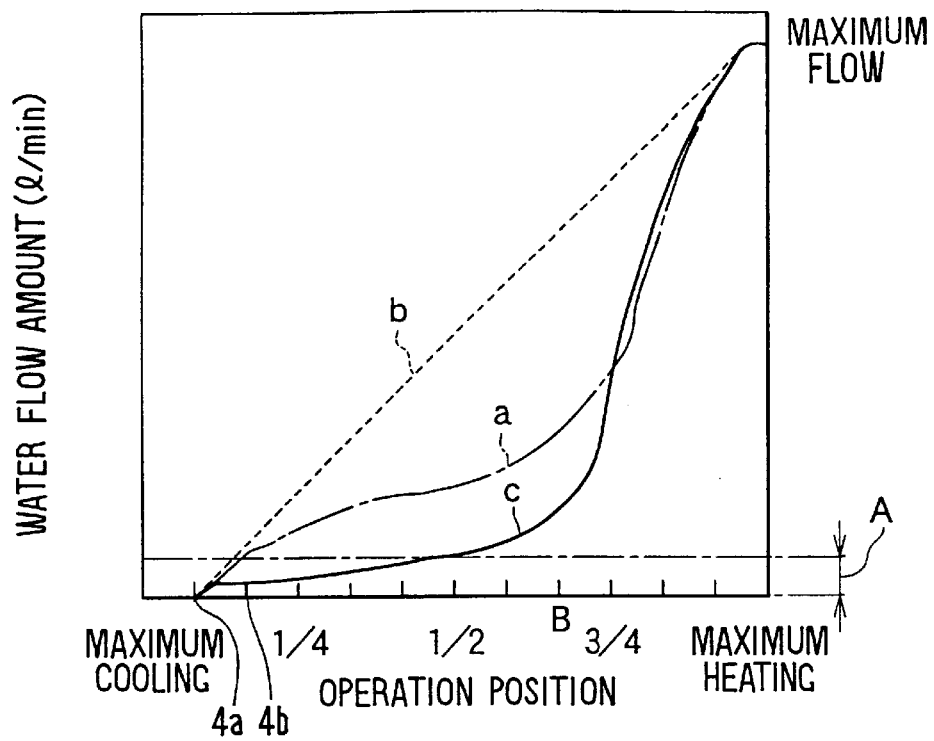
FIG. 4 is a graph showing flow-amount adjustment characteristics of the hot water valve according to the first embodiment.
Figure 5:
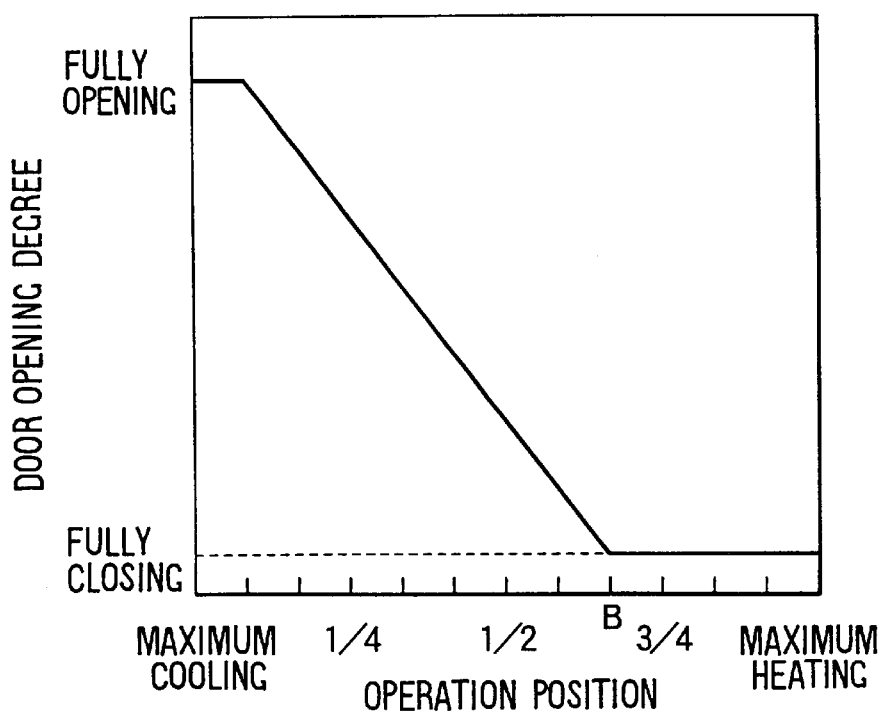
FIG. 5 is a graph showing opening degree characteristics of a cool air bypass door according to the first embodiment.
Figure 6:
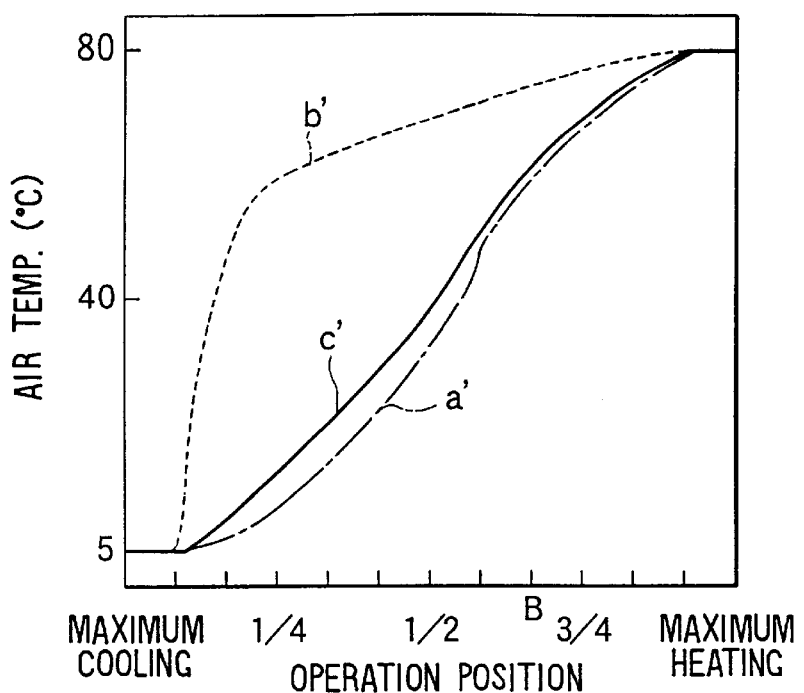
FIG. 6 is a graph showing air-temperature adjustment characteristics according to the first embodiment.

The temperature adjustment of the air-conditioning apparatus of the first embodiment will be now described with reference to FIGS. 4–7. In FIGS. 4–6, the horizontal axis shows an operation position of the temperature-adjustment operation member 29. At the maximum cooling position (i.e., lowest-temperature position) of the temperature-adjustment operation member 29, the hot water valve 16 is fully closed as shown in FIG. 2. On the other hand, at the maximum heating position (i.e., highest-temperature position) of the temperature-adjustment operation member 29, the hot water valve 16 is fully opened as shown in FIG. 3.

When the temperature-adjustment operation member 29 is operated from the maximum cooling position toward the maximum heating position, the opening degree (i.e., opening area of the valve port 22) of the hot water valve 16 is increased, and a flow amount of hot water passing through the hot water valve 16 is also increased as shown by the chain line a in FIG. 4.

FIG. 5 shows the relationship between the opening degree of the cool air bypass door 31 and the operation position of the temperature-adjustment operation member 29. The cool air bypass door 31 is operated to the solid line position in FIG. 1 to become in a fully closed state, at the maximum heating position of the temperature-adjustment operation member 29. Until the temperature-adjustment operation member 29 is operated from the maximum heating position to a middle position B (a predetermined position), the fully closed state of the cool air bypass door 31 is maintained.

After the temperature-adjustment operation member 29 is operated to the middle position B from the maximum heating position, the cool air bypass door 31 is opened. Thereafter, when the temperature-adjustment operation member 29 is operated from the middle position B toward the maximum cooling position, the opening degree of the cool air bypass door 13 is continuously increased. Further, at the maximum cooling position of the temperature-adjustment operation member 29, the cool air bypass door 31 is operated to the chain line position in FIG. 1 to be fully opened.

Thus, according to the first embodiment, at the maximum cooling position of the temperature-adjustment operation member 29, the hot water valve 16 is fully closed, and the cool air bypass door 31 is fully opened so that air flow resistance is reduced. Therefore, maximum cooling capacity is obtained at the maximum cooling position of the temperature-adjustment operation member 29. Further, at the maximum heating position of the temperature-adjustment operation member 29, the hot water valve 16 is fully opened and the cool air bypass door 31 is fully closed, so that all blown-air passes through the heater core 13. Therefore, maximum heating capacity is obtained in the maximum heating position of the temperature-adjustment operation member 29.

Further, because the cool air bypass door 31 fully closes the cool air bypass passage 30 during the operation range of the temperature-adjustment operation member 29 between the maximum heating position and the position B, temperature of air to be blown into the passenger compartment is adjusted only by the hot-water flow adjustment of the hot water valve 16. Further, when the temperature-adjustment operation member 29 is operated from the middle position B toward the maximum cooling side, the cool air bypass door 31 opens the cool air bypass passage 30, and cool air C shown in FIG. 1 passes through the cool air bypass passage 30. Thus, between the middle position B and the maximum cooling position of the temperature-adjustment operation member 29, cool air C is mixed with warm air D having passed through the heater core 13 so that conditioned air having a predetermined temperature is obtained.

That is, when the operation member 29 is operated between the middle position B and the maximum cooling position, the air amount of air passing through the cool air bypass passage 30 is adjusted by the cool air bypass door 31 as shown in FIG. 5, while the flow amount of hot water flowing into the heater core 13 is adjusted by the hot water valve 16 in accordance with the control line "a" in FIG. 4. That is, the temperature of air blown into the passenger compartment is adjusted by combining the hot-water flow adjustment of the hot water valve 16 and the cool-air amount adjustment of the cool air bypass door 31. Therefore, in the first embodiment, the cool air bypass door 31 is used as a temperature-adjusting door.

If the hot water valve 16 is adjusted so that the flow amount of hot water flowing into the heater core 13 is increased in proportion to an increase of the operation position (operation stroke) of the temperature-adjustment operation member 29 as shown by the chain line "b" in FIG. 4, an increase ratio of hot water flowing into the heater core 13 is large from the heat-radiating characteristics of the heater core 13. Therefore, as shown by the chain line "b'" in FIG. 6, the temperature of air from the heater core 17 is rapidly increased only by operating the temperature-adjustment operation member 29 with a small operation amount from the maximum cooling position. For improving the control characteristics of air blown from the heater core 13, the hot water valve 16 may be controlled as shown by the solid line "c" in FIG. 4. When the hot water valve 16 operates in accordance with the flow characteristics shown by the solid line "c" in FIG. 4, because the temperature of air blown from the heater core 13 is slowly increased relative to the operation stoke of the temperature-adjustment operation member 29, the temperature of air blown from the heater core 13 is 20 readily adjusted.

However, according to the flow amount characteristics shown by the solid line "c" in FIG. 4, in a low-temperature operation area (approximate half area among an entire operation range) of the temperature-adjustment operation member 29, a minute flow area A of hot water is set, and therefore, flow noise of hot water is increased. Here, in the minute flow area A, the flow amount of hot water is smaller than 5% of the maximum flow amount due to the hot water valve 16. For setting the minute flow area A, it is necessary to set the hot water valve 16 at a minute opening degree, thereby causing the flow noise of the hot water.

To overcome this problems, in the first embodiment, when the temperature-adjustment operation member 29 is operated from the maximum cooling position (i.e., the position shown by "4a" in FIG. 4) to a high-temperature side position (i.e., the position shown by "4b" in FIG. 4) by a one notch (step), the opening degree of the hot water valve 16 is increased at one stroke to be larger than the minute flow area A. That is, the hot water valve 16 of the first embodiment is constructed so that a minute flow area equal to or lower than the area A is not set. This structure of the hot water valve 22 is readily set by selecting the opening shape of the valve port 22 shown in FIGS. 2, 3.

As described above, in the first embodiment, because the flow amount of hot water flowing into the heater core 13 is not adjusted within a minute flow amount, the flow noise of hot water due to the minute opening degree of the hot water valve 16 is effectively prevented.

On the other hand, because the flow amount of hot water flowing into the heater core 13 is increased at one step from the fully closing state of the hot water valve 16 to a hot water flow amount corresponding to a flow area equal to or larger than the minute flow area A, when the temperature of air blown into the passenger compartment is adjusted only by using the hot water valve 16, the temperature of air blown into the passenger compartment is rapidly increased in a low-temperature operation area, similarly to the characteristics shown by line "b'" in FIG. 6. However, according to the first embodiment of the present invention, because the hot water valve 16 and the cool air bypass door 31 are operatively linked so that the flow amount of cool air bypassing the heater core 13 is increased in the low-temperature operation area (i.e., the maximum cooling side area of the hot water valve 16), the temperature of air blown into the passenger compartment is prevented from rapidly increasing by the cool air instruction from the cool air bypass passage 30.

Therefore, as shown by the line "a'" in FIG. 6, even when the hot water valve 16 does not adjust the flow amount of hot water to be in the minute flow area A, the temperature of air blown into the passenger compartment can be controlled to be slowly increased in the low-temperature operation area on the maximum cooling side. Thus, even in the low-temperature operation area on the maximum cooling side, the temperature adjustment of air to be blown into the passenger compartment is accurately adjusted.

Figure 7:
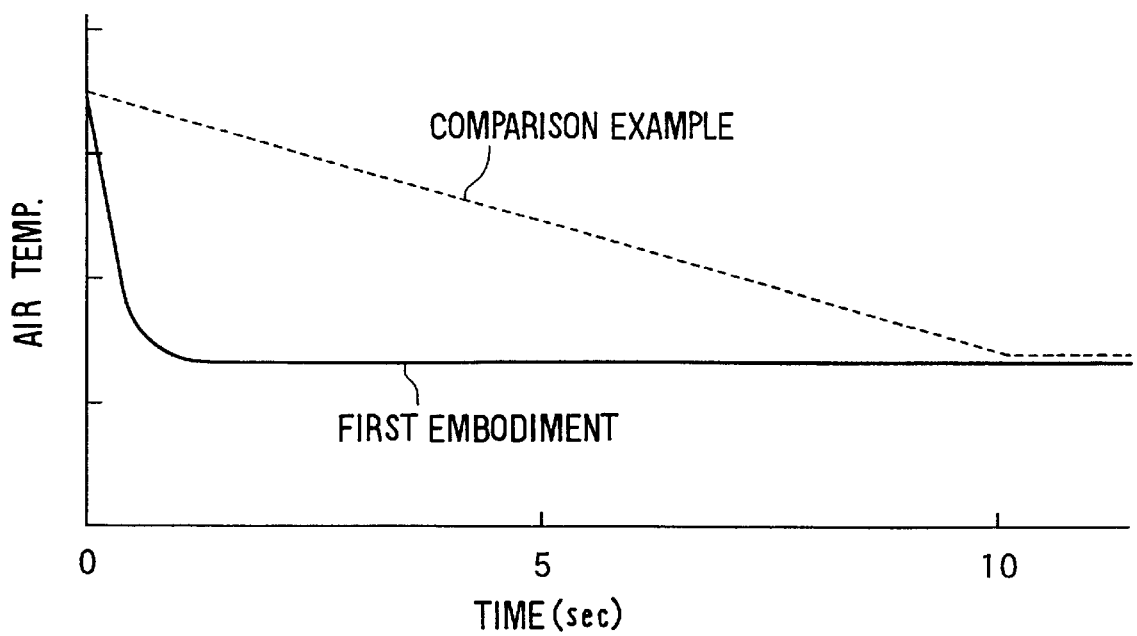
FIG. 7 is a graph showing air-temperature response characteristics according to the first embodiment.

Further, in the low-temperature area of the operation member 29, temperature-changing response performance of blown-air is greatly improved. FIG. 7 shows the relationship between temperature of air blown into the passenger compartment and the time when the temperature-adjustment operation member 29 operates toward the low-temperature side from the 1/2 position to 1/4 position shown in the horizontal axis in FIGS. 4–6. In FIG. 7, the solid line shows the first embodiment of the present invention, and the chain line shows a comparison example (i.e., the flow characteristics "c" in FIG. 4) where the temperature of air blown into the passenger compartment is controlled only by the adjustment of the hot water valve 16 while the cool air bypass passage 30 and the cool air bypass door 31 are not provided.

As shown in FIG. 7, in the comparison example, even when the hot water amount is throttled by the hot water valve, because the temperature of air is not decreased immediately due to the heat capacity of the heater core 13, about 10 seconds are necessary for reducing the air temperature to a temperature corresponding to the 1/4 operation position of the temperature-adjustment operation member 29.

According to the first embodiment of the present invention, with the operation position change of the temperature-adjustment operation member 29 from the 1/2 position to 1/4 position shown in the horizontal axis in FIGS. 4–6, the opening degree of the cool air bypass door 31 is immediately increased to a predetermined opening degree. Therefore, the air temperature is reduced in a very short time after the operation position of the temperature-adjustment operation member 29 changes in the low-temperature area, and the response performance of the air temperature in the low-temperature area is remarkably improved.

Further, because the cool air bypass door 31 is disposed only for opening and closing the cool air bypass passage 30, the an air passage of the heater core 13 is not needed to be closed. That is, the air passage of the heater core 13 is always opened in the present invention. Thus, the operation space of the cool air bypass door 31 is greatly smaller than that of an air mixing door.

Figure 8:
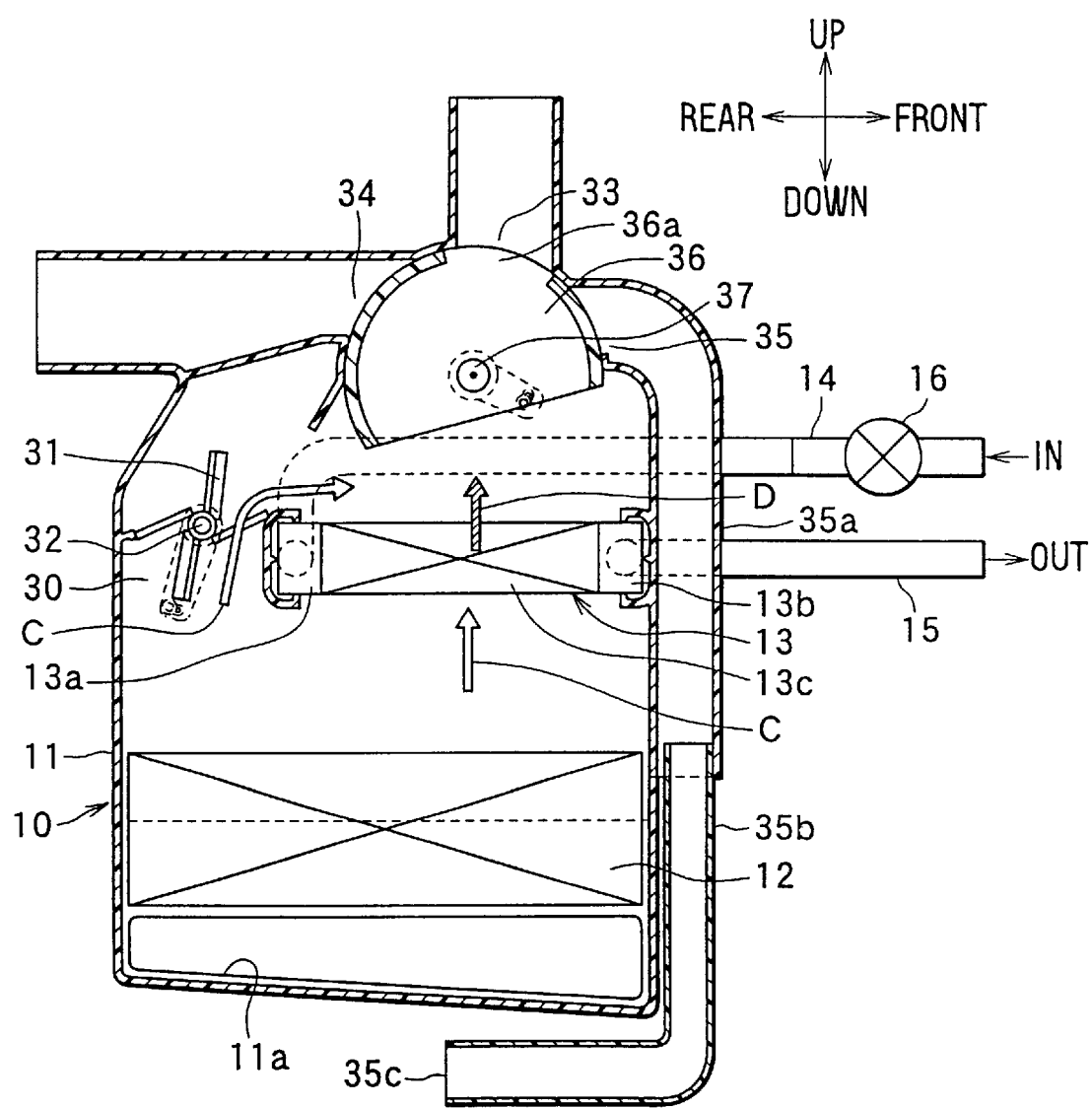
FIG. 8 is a schematic sectional view of a vehicle air conditioning apparatus according to a second preferred embodiment of the present invention.

A second preferred embodiment of the present invention will be now described with reference to FIGS. 8, 9. In the second embodiment, numbers of components similar to those in the first embodiment are indicated with the same reference numbers, and the explanation thereof is omitted.

In the above-described first embodiment, the evaporator 12 and the heater core 13 are disposed in the vehicle front-rear direction at a vehicle rear side of the air inlet 11a in this order within the air conditioning case 11. However, in the second embodiment, the air inlet 11a is provided at a bottom side of the air conditioning case 11, the evaporator 12 is disposed approximately horizontally at a vehicle upper side of the air inlet 11a, and the heater core 13 is disposed approximately horizontally at a vehicle upper side of the evaporator 12.

In the arrangement of the air conditioning unit 10, air blown by the blower unit offset to the front-passenger's seat side can be directly introduced into the air conditioning unit 10 under the evaporator 12. Therefore, the dimension of the air conditioning unit 10 in the vehicle front-rear direction is readily reduced.

Further, with the approximately horizontal arrangement of the heater core 13, the cool air bypass passage 30 and the cool air bypass door 31 can be disposed at a vehicle rear side of the heater core 13. Similarly to the first embodiment, the heater core 13 is a one-way flow type (full-pass type). However, in the second embodiment, the hot water inlet tank 13a is provided at a vehicle rear position of the heater core 13 to be adjacent to the cool air bypass passage 30, and the hot water outlet tank 13b is provided at a vehicle front position of the heater core 13. Thus, hot water from the hot water inlet tank 13a on the vehicle rear side flows into the hot water outlet tank 13b after passing through the entire flat tubes of the heat-exchanging core portion 13c in one way.

Further, in the second embodiment of the present invention, the three opening portions 33, 34, 35 are provided in the air conditioning case 11 at positions different from that of the first embodiment. That is, the defroster opening portion 33 is disposed at a middle position in the vehicle front-rear direction, the face opening portion 34 is provided at a vehicle rear side of the defroster opening portion 33, and the foot opening portion 35 is provided at a vehicle front side of the defroster opening portion 33. Thus, the opening portions 33, 34, 35 are opened by communicating with the an opening port 36a of the rotary door 36. FIG. 8 shows a state of a defroster mode where the defroster opening portion 33 is opened.

The foot opening portion 35 is connected to a duct member 35b separately formed with the air conditioning case 11 through a foot duct 35a formed integrally with a wall surface of the air conditioning case 11 on the vehicle front side. A top end of the duct member 35b extends to a lower side under the bottom surface of the air conditioning case 11. A branch duct (not shown) for leading air toward the foot area of a front passenger on both right and left sides is connected to a top end opening portion 35c of the duct member 35b. Further, a rear foot duct (not shown) may be connected to the top end opening portion 35c of the duct member 35b.

On the other hand, similarly to the first embodiment, the hot water valve 16 disposed in the hot water inlet pipe 14 of the heater core 13 and the cool air bypass door 31 are operatively connected to the temperature-adjustment operation member 29 (see FIG. 1) of the air-conditioning operation panel 28. That is, even in the second embodiment, both the hot water valve 16 and the cool air bypass door 31 are operatively linked and are operated by the manual operation of the temperature-adjustment operation member 29. Thus, the temperature-adjustment operation member 29 is used as an operation unit for operating both the hot water valve 16 and the cool air bypass door 31.

Figure 9:
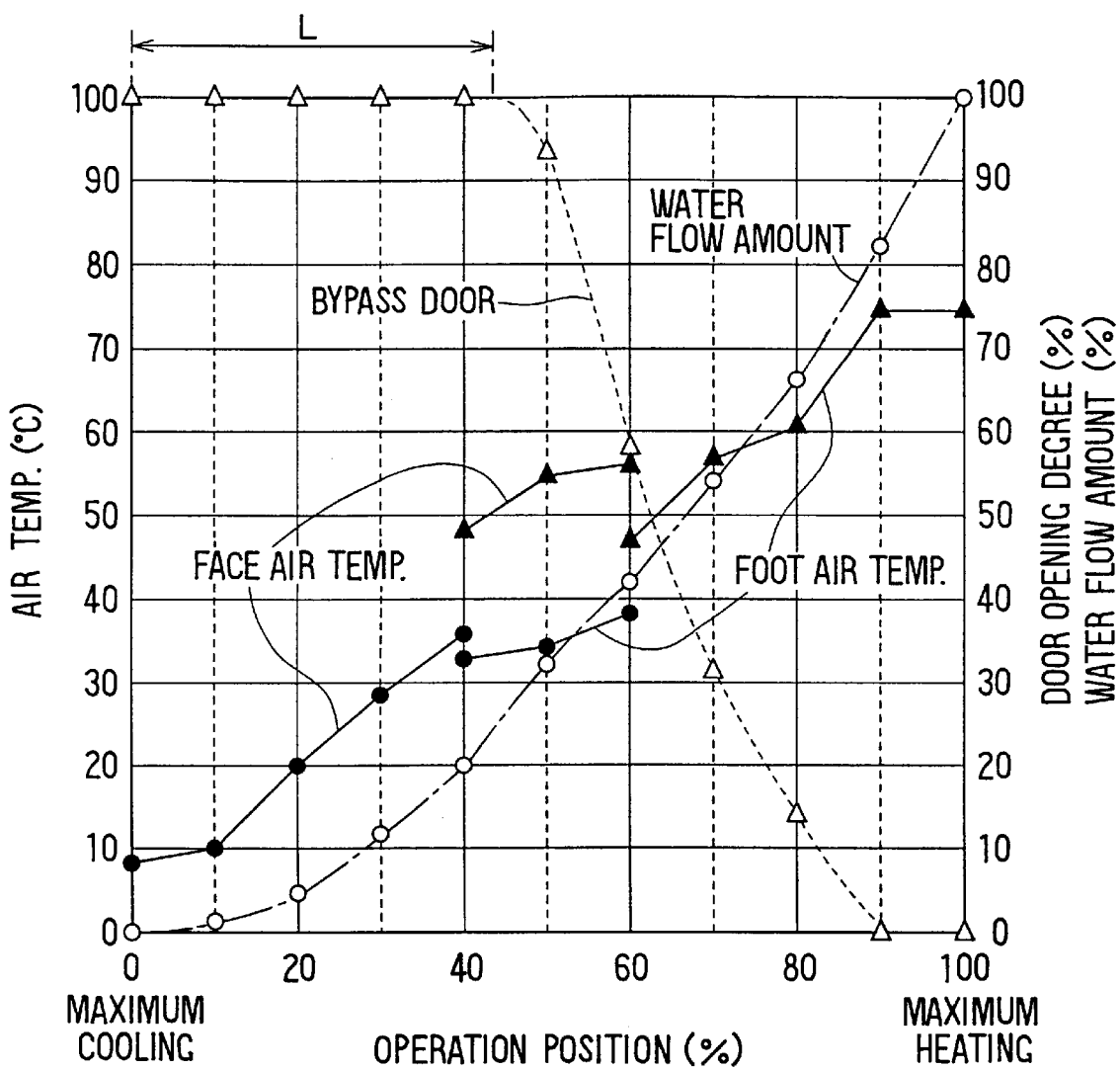
FIG. 9 is a graph showing flow-amount adjustment characteristics of a hot water valve, opening degree characteristics of a cool air bypass door and air temperature characteristics, according to the second embodiment.

FIG. 9 shows the operatively linked characteristics of the hot water valve 16 and the cool air bypass door 31 according to the second embodiment. The horizontal axis in FIG. 9 indicates the operation position of the temperature-adjustment operation member 29. In the horizontal axis of FIG. 9, the maximum cooling position (the lowest-temperature position) where the hot water valve 16 is fully closed is set at 0%, and the maximum heating position (i.e., highest temperature position) where the hot water valve 16 is fully opened is set at 100%, and the operation position of the temperature-adjustment operation member 29 is indicated by percentages. Further, in the vertical axis of FIG. 9, both of the flow amount of hot water adjusted by the hot water valve 16 and the opening degree of the cool air bypass door 31 are indicated by percentages, and the temperature of air blown into the passenger compartment, adjusted by the hot water valve 16 and the cool air bypass door 31, is indicated.

In the second embodiment, not only the cool air bypass door 13 is fully opened at the operation position near the maximum cooling, but also the cool air bypass door 31 is continuously fully opened until the 40% operation position of the cool air bypass door 31 in a predetermined range L shown in FIG. 9. The reason is described hereinafter.

That is, for preventing the evaporator 12 from frosting in the vehicle air conditioning apparatus, the operation of the compressor of the refrigerant cycle is controlled so that the temperature of air blown from the evaporator 12 is set at a predetermined temperature (3–4° C.). During normal operation of the vehicle air-conditioning apparatus, the cool air C having passed through the evaporator 12 is approximately maintained at a certain temperature. Conversely, the temperature of hot water (engine-cooling water) circulating in the heater core 14 is changed with the operation state of the vehicle engine. Therefore, the temperature of warm air D passing through the heater core 14 is readily changed in accordance with the change of the temperature and the flow amount of hot water, and in accordance with the change of the air amount passing through the heater core.

In recent years, a direct-injection engine is generally used for improving fuel-consumption effect. In the direct-injection engine, the temperature of hot water is greatly changed between the operation of a lean air/fuel ratio area and the operation of an ideal air/fuel ratio. Thus, when the opening degree of the hot water valve 16 is in a minute opening area so that the flow amount of hot water flowing into the heater core 14 is in the minute flow area, the temperature of air from the heater core 13 may be greatly changed by the variation in the temperature of hot water.

However, according to the second embodiment of the present invention, in the predetermined area L where the operation position of the temperature-adjustment operation member 29 is in a low-temperature side and the flow amount of hot water is relatively small, the cool air bypass door 31 is maintained at the fully opened state, and therefore, the ratio of cool air C having the predetermined temperature, passing through the bypass passage 30, is maintained at the maximum state. Thus, even when the temperature of warm air D is changed, the variation in the temperature of air after mixing the cool air C and the warm air D can be remarkably reduced.

Because a face mode for blowing air (cool air) toward the head portion of a passenger from the face opening portion 34 is selected in a low-temperature (cool side) operation area of the temperature-adjustment operation member 29, the variation in the temperature of air blown into the passenger compartment is readily sensed from the head portion (face portion) of the passenger. In the second embodiment, as described above, since the variation range of the temperature of blown-air on the low-temperature operation side is reduced, the air-conditioning feeling in the face mode is improved.

In the second embodiment, as shown in FIG. 9, the face mode is set when the operation position of the temperature-adjustment operation member 29 is in a range between the maximum cooling position (i.e., 0% position) and the 40% operation position. Therefore, during the all area of the face mode, the cool air bypass door 31 is maintained at the fully opened state, and the cool air bypass passage 30 is always fully opened.

Next, when the operation position of the temperature-adjustment operation member 29 is in a range of 40–60%, a bi-level mode where air is blown from both the face opening portion 34 and the foot opening portion 35 is set. When the bi-level mode is set from the face mode, the opening degree of the cool air bypass door 31 starts to be reduced, and the temperature of air blown into the passenger compartment is adjusted by combining the opening degree adjustment of the cool air bypass door 31 and the hot water flow adjustment of the hot water valve 16. Further, during the bi-level mode, because the temperature of air blown from the face opening portion 34 and the temperature of air blown from the foot opening portion 35 have a predetermined temperature different, an up-down temperature distribution for "cooling the head portion and for heating the foot portion" can be obtained. The up-down temperature distribution is readily obtained by providing the face opening portion 34 at the side of the cool air bypass passage 30 and by providing the foot opening portion 35 at the warm air side on the downstream air side of the heater core 13.

Next, when the operation position of the temperature-adjustment operation member 29 is in a range of 60–100%, the foot mode where air is blown from the foot opening portion 35 is set. Even in the foot mode, the temperature of air blown into the passenger compartment is adjusted by the combination between the opening degree adjustment of the cool air bypass door 31 and the hot-water flow adjustment of the hot water valve 16.

During the foot mode, because the opening degree of the cool air bypass door 31 is further reduced and the cool air amount passing through the cool air bypass passage 30 is further reduced, the temperature of air blown into the passenger compartment is readily changed with the variation in the hot-water temperature. However, since the air is blown toward the foot area during the foot mode, the variation in the air temperature is relatively difficult to be sensed, as compared with the face mode where the air is blown toward the head portion (face portion) of the passenger. As a result, generally, the variation of the air temperature during the foot mode is hardly affected to the air-conditioning sense.

Further, in the second embodiment shown in FIG. 9, the fully closed state of the cool air bypass door 31 is set only in the operation range of 90–100% of the temperature-adjustment operation member 29, proximate to the maximum heating position, and the cool air amount passing through the cool air bypass passage 30 is set to zero only in the operation range. Therefore, even during the foot mode, when the operation position is in the range of 60–90%, the temperature of air blown into the passenger compartment is adjusted by mixing the warm air from the heater core 13 and the cool air from the cool air bypass passage 30, and thereby reducing the variation in the temperature of air blown from the foot opening portion 35.

Although the present invention has been fully described in connection with the preferred embodiments thereof with reference to the accompanying drawings, it is to be noted that various changes and modifications will become apparent to those skilled in the art.

For example, in the above-described second embodiment of the present invention, the predetermined area L where the fully opened state of the cool air bypass door 31 is maintained is set in the operation area corresponding to the operation position range of 0–40% of the temperature-adjustment operation member 29. However, the predetermined range L corresponding to the operation position range of the temperature-adjustment operation member 29 can be changed. As a result of experiments by the inventors of the present invention, for improving the air-conditioning feeling during the face mode, it is necessary to set the predetermined range to be equal to or more than 20% relative to the entire operation range of the temperature-adjustment operation member 29.

Figure 10:
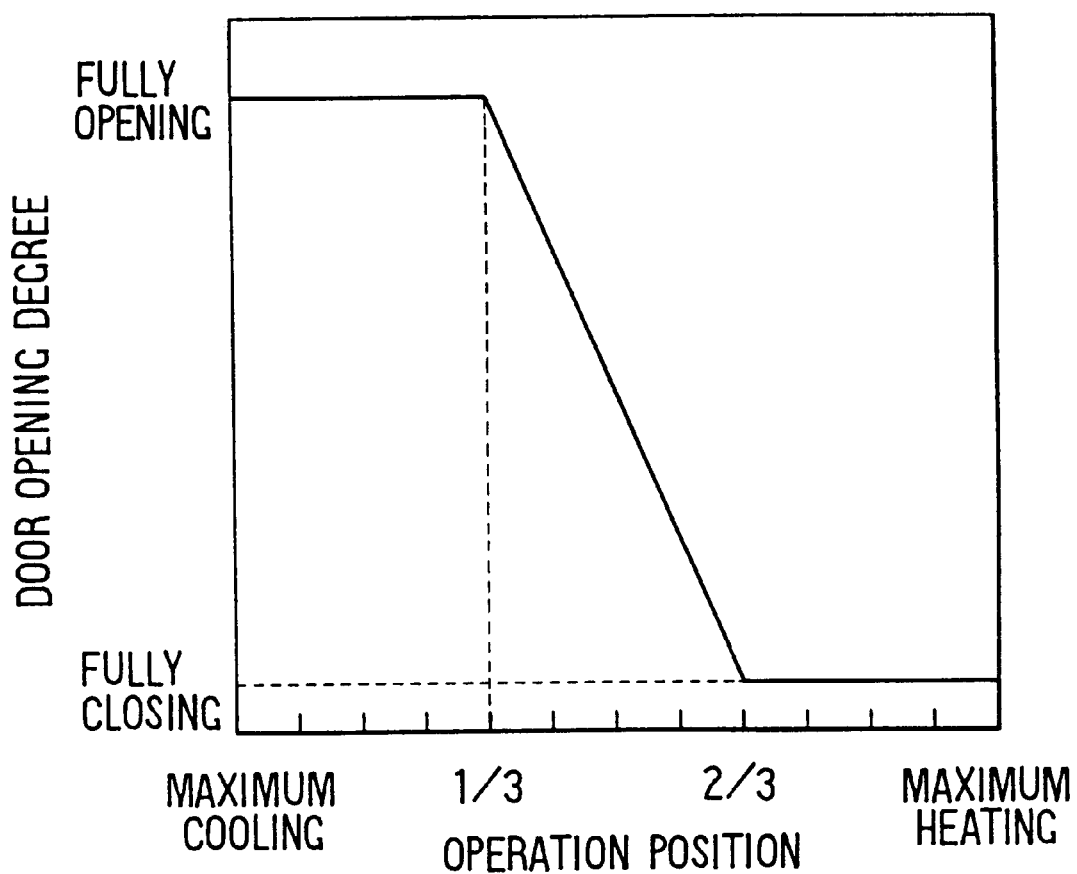
FIG. 10 is a graph showing opening degree characteristics of a cool air bypass door according to the other embodiment of the present invention.

Thus, the opening degree of the cool air bypass door 31 can be changed relative to the operation position of the temperature-adjustment operation member 29. For example, as shown in FIG. 10, in the predetermined high-temperature area between the operation position 2/3 and the maximum heating position of the temperature-adjustment operation member 29, the cool air bypass door 31 is fully closed, and the temperature of air blown into the passenger compartment is adjusted only by the hot-water flow adjustment of the hot water valve 16. On the other hand, in the predetermined low-temperature area between the operation position 1/3 and the maximum cooling position of the temperature-adjustment operation member 29, the cool air bypass door 31 is fully opened.

In the above-described second embodiment of the present invention, with the variation in the temperature of air blown into the passenger compartment from the low-temperature side to the high-temperature side, an air outlet mode is automatically changed in the order of the face mode, the bi-level mode and the foot mode. However, the present invention may be applied to a vehicle air conditioning apparatus where the fully opened state of the cool air bypass door 31 is maintained during the face mode, while the temperature of air blown into the passenger compartment is adjusted by the combination of cool-air amount adjustment of the cool air bypass door 31 and the hot-water amount adjustment of the hot water valve 16 during the bi-level mode and the foot mode.

In the above-described first and second embodiments of the present invention, the hot water valve 16 and the cool air bypass door 31 are connected through the mechanical connection mechanism such as the link mechanism to be cooperated so that the hot water valve 16 and the cool air bypass door 31 are operated by the operation of the operation member 29. However, the hot water valve 16 and the cool air bypass door 31 may be electrically operated to be operatively linked. For example, the hot water valve 16 and the cool air bypass door 31 are electrically driven by a single common actuator through a suitable link mechanism, an electrical signal corresponding to the set temperature by the temperature-adjustment operation member 29 is generated, and an operation amount of actuator is controlled based on the electrical signal corresponding to the set temperature.

On the other hand, an actuator for only driving the hot water valve 16 and an actuator for only driving the cool air bypass door 31 may be provided, and both the actuators may be electrically operated and operatively linked based on the signal of the set temperature set by the temperature-adjustment operation member 29.

When the hot water valve 16 and the cool air bypass door 31 are driven by the actuator, the operation member for cooperating the hot water valve 16 and the cool air bypass door 31 may be formed by the actuator and the like.

In the above-described first embodiment of the present invention, as shown in FIG. 4, in an area where the temperature-adjustment member 29 operates from the operation position B to the low-temperature side, the opening degree of the hot water valve 16 is reduced and the flow amount of hot water is reduced. However, in the area from the operation position B to the low-temperature side, the opening degree of the hot water valve 16 may be set to be approximately constant. Therefore, in this area, the temperature of air blown into the passenger compartment can be adjusted only by adjusting the cool air amount due to the cool air bypass door 31, while the flow amount of hot water flowing into the heater core 13 is set to be approximately equal.

Further, in the above-described first and second embodiments, the present invention is typically applied to the air conditioning unit for the vehicle front seat. However, the present invention may be applied to an air conditioning unit for a vehicle rear seat, and may be applied to an air conditioning unit without having the evaporator 12.

Such changes and modifications are to be understood as being within the scope of the present invention as defined by the appended claims.

What is claimed is:

1. An air conditioning apparatus for a vehicle having a passenger compartment, comprising:

an air conditioning case for defining an air passage through which air flows;

a heating heat exchanger for heating air, said heating heat exchanger being disposed in said air conditioning case to form a bypass passage through which air bypasses said heating heat exchanger;

a hot water valve for adjusting a flow amount of hot water flowing into said heating heat exchanger;

a bypass door for opening and closing said bypass passage; and an operation member for cooperating said hot water valve and said bypass door, said operation member being operable in an entire operation range between a lowest-temperature position where temperature of air blown into the passenger compartment becomes minimum and a highest-temperature position where the temperature of air blown into the passenger compartment becomes maximum, wherein:

in a first area from the lowest-temperature position among the entire operation range of said operation member, the temperature of air to be blown into the passenger compartment is adjusted by a hot-water flow adjustment of said hot water valve while said bypass door maintains at a fully opened state where said bypass passage is fully opened;

when the operation member operates from the first area to a side of the highest-temperature position, said bypass door reduces the opening degree of said bypass passage from said fully opened state so that the temperature of air to be blown into the passenger compartment is adjusted by combining the hot-water flow adjustment of said hot water valve and an air flow adjustment of said bypass door.

2. The air conditioning apparatus according to claim 1, wherein said first area is set to be 20% or more of the entire operation range of said operation member.

3. The air conditioning apparatus according to claim 1, wherein said bypass door fully closes said bypass passage only in an area proximate to said highest operation position of said operation member.

4. The air conditioning apparatus according to claim 1, wherein in a second area from the highest-temperature position among the entire operation range of said operation member, the temperature of air to be blown into the passenger compartment is adjusted by the hot-water flow adjustment of said hot water valve while said bypass door maintains at a fully closed state where said bypass passage is fully closed.

5. An air conditioning apparatus for a vehicle having a passenger compartment, comprising:

an air conditioning case for defining an air passage through which air flows, said air conditioning case having a face opening from which conditioned air is blown toward an upper side of the passenger compartment, and a foot opening from which conditioned air is blown toward a lower side of the passenger compartment;

a heating heat exchanger for heating air, said heating heat exchanger being disposed in said air conditioning case to form a bypass passage through which air bypasses said heating heat exchanger;

a hot water valve for adjusting a flow amount of hot water flowing into said heating heat exchanger; and a bypass door for opening and closing said bypass passage, wherein said hot water valve and said bypass door are disposed in such a manner that:

in a first set temperature area where temperature of air blown into the passenger compartment is set to be lower than a first predetermined temperature, a face mode where air is blown from said face opening is set, and temperature of air to be blown into the passenger compartment is adjusted by a hot-water flow adjustment of said hot water valve while said bypass door fully opens said bypass passage during said face mode;

in a second set temperature area where the temperature of air blown into the passenger compartment is set to be higher than a second predetermined temperature higher than the first predetermined temperature, a foot mode where air is blown from said foot opening is set;

in a third set temperature area between the first and second set temperature areas, a bi-level mode where air is blown from both said face opening and said foot opening is set; and during the foot mode and the bi-level mode, an opening degree of said bypass door is reduced from a fully-opened state, and the temperature of air to be blown into the passenger compartment is adjusted by combining the hot-water flow adjustment of said hot water valve and an air flow adjustment of said bypass door.

6. The air conditioning apparatus according to claim 5, further comprising a rotary door for opening and closing said face opening and said foot opening.

* * * * *